(12) United States Patent
Grasselli et al.

(10) Patent No.: US 8,593,295 B2
(45) Date of Patent: Nov. 26, 2013

(54) PROCESS FOR DETECTING AN ALARM IN AN OPERATING MACHINE BY DETERMINING AN ELECTRIC INTERACTION BETWEEN THE OPERATOR AND THE MACHINE

(75) Inventors: Giorgio Grasselli, Albinea (IT); Stefano Santini, Reggio Emilia (IT)

(73) Assignee: Grasselli, Giorgio, Albinea (IT)

( * ) Notice: Subject to any disclaimer, the term of this patent is extended or adjusted under 35 U.S.C. 154(b) by 544 days.

(21) Appl. No.: 12/903,583

(22) Filed: Oct. 13, 2010

(65) Prior Publication Data

US 2011/0084847 A1    Apr. 14, 2011

(30) Foreign Application Priority Data

Oct. 14, 2009    (IT) ................ MI2009A1756

(51) Int. Cl.
*G08B 21/00* (2006.01)

(52) U.S. Cl.
USPC ........... 340/679; 340/650; 340/661; 192/130; 361/23

(58) Field of Classification Search
USPC ......... 340/679, 635, 649, 650, 652, 660–664, 340/680; 192/129 R–132; 361/23
See application file for complete search history.

(56) References Cited

U.S. PATENT DOCUMENTS

| | | |
|---|---|---|
| 5,510,685 A | 4/1996 | Grasselli |
| 7,049,967 B2 | 5/2006 | Grasselli et al. |
| 2003/0193400 A1 | 10/2003 | Grasselli et al. |
| 2005/0155473 A1 | 7/2005 | Gass |

FOREIGN PATENT DOCUMENTS

| | | |
|---|---|---|
| EP | 0636830 A1 | 2/1995 |
| EP | 1353111 A2 | 10/2003 |
| FR | 2846729 A1 | 5/2004 |
| IT | RE1993U000060 | 7/1993 |

*Primary Examiner* — Jeffery Hofsass
(74) *Attorney, Agent, or Firm* — Pearne & Gordon LLP

(57) ABSTRACT

A process for detecting an alarm in an operating machine (1), so that an operator (7) is able to interact with such a machine (1) determining a connection between the machine and the ground, comprising the steps of: determining a current value of a main parameter representative of an electric interaction between said operator (7) and said operating machine (1) under a condition of normal operation of said machine (1); comparing said determined current value with a main reference value; activating an alarm procedure as a function of said comparison. The process further comprises a starting setting step wherein said main reference value is determined, said starting setting step comprising the steps of: detecting a first reference value of said main parameter under a condition of electric insulation between said operator (7) and operating machine (1); detecting a second reference value of said main parameter under a condition of electric conduction between said operator (7) and operating machine (1); said main reference value being determined in such a manner that it is an intermediate value between said first reference value and second reference value. The invention also describes a safety system (100) for carrying out the described process and an operating machine comprising such a safety system (100).

17 Claims, 3 Drawing Sheets

PROCESS FOR DETECTING AN ALARM IN AN OPERATING MACHINE BY DETERMINING AN ELECTRIC INTERACTION BETWEEN THE OPERATOR AND THE MACHINE

APPLICATION FIELD OF THE INVENTION

The present invention relates to a process and a system for detecting an alarm in operating machines designed to protect the safety of an operator.

In particular, the process and system apply to any type of operating machines having at least one moving member or tool with which the operator may accidentally come into contact.

More specifically, the process and system apply to a particular operating machine referred to as flaying machine and the following description is given with reference to this application field for the only purpose of simplifying explanation thereof.

KNOWN ART

It is known that a flaying machine (or a machine for membrane removal) comprises a frame supporting a flat top on which a piece of meat to be flayed is laid down; the flaying machine is equipped with a toothed roller set in rotation by a motor and dragging along the piece of meat, manually retained by the operator, so as to submit it to the action of a blade, for carrying out separation of the lean meat or flesh from the thick skin.

The operator moves the piece of meat close to the roller that automatically drags along the product, but his/her hands act in the vicinity of the roller and the blade.

During operation there is the risk of an accidental and unexpected contact of the operator's hands with the blade, due to inattention or unforeseen events that could cause sudden and unintentional movements of the operator's hands.

For the above reasons, the flaying machines can be provided with electronic systems designed to protect the operator's safety.

However, these systems have the drawback that sometimes intervention of same takes place also in the absence of a real danger, giving rise to an undesirable stopping of the machine bringing about delays in production and reduction in the work time.

During operation there is also the risk of accidental contact with the hands of persons having tasks of different nature that, although not specifically working on the flaying machine, may be obliged to pass close thereto or perform functions in the vicinity of the machine itself.

To partly reduce this problem, in the Italian patent No. 0000231035 the same Applicant discloses a safety system for flaying machine using as the critical parameter of detection of an alarm situation, the voltage drop between the flaying machine and the earth, compared with a reference signal; the latter however cannot be easily estimated as it is affected by the electro-physical features of the operator responsible for the machine and by the environmental conditions, such as moisture and temperature.

Therefore, as it can be easily understood, the problem concerning undesirable stops cannot be easily solved.

It is an aim of the present invention to provide an improved process and system for detecting an alarm in operating machines, which can therefore enable a timely intervention and only under conditions of real danger, thus offering more security to the operator during use of the operating machine.

Another aim is to provide a detecting process and system allowing a reliable and accurate detection of threshold values that are personalized based on the operator.

A further aim is to provide an alarm-detecting process and system that are of simple accomplishment.

SUMMARY OF THE INVENTION

The foregoing and further aims are substantially achieved by the process and system for detecting an alarm in operating machines as described in the appended claims.

The process and system according to the invention achieves the following advantages:
- the fixed threshold is precise enabling an undesirable stop of the machine to be avoided as much as possible;
- the threshold value is precise as it is the personalized calculation based on the operator;
- the detection procedure is simple;
- the operating machine on the whole enables a greater number of worked hours.

The foregoing and further advantages of the invention will appear in greater detail from the description of an embodiment thereof given hereinafter by way of non-limiting example and with reference to the accompanying drawings

DETAILED DESCRIPTION

Figure 1:
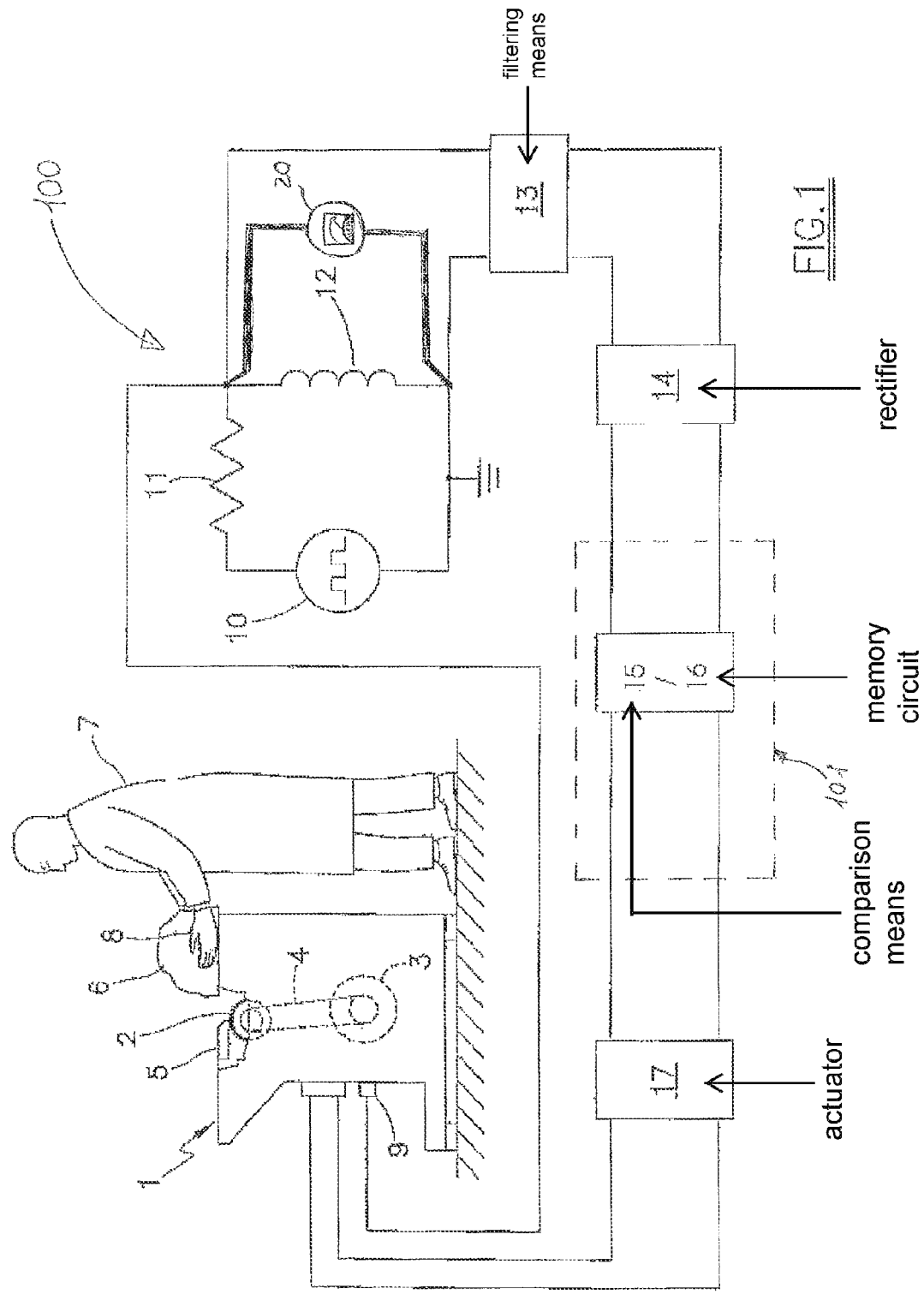
FIG. 1 shows a block diagram of an electric system for detecting an alarm in a flaying machine in the presence of an operator, according to the present invention.

Shown in FIG. 1 is a conventional flaying machine 1 comprising a frame supporting a flat top on which a piece of meat to be flayed is laid down; this machine is equipped with a toothed roller 2 set in rotation by an electric motor 3 through a toothed belt 4.

Roller 2 drags along the piece of meat 6, manually retained by an operator 7, for submitting it to the action of a fixed blade 5 suitable to interact with the piece of meat 6 for separating the thick skin or membrane from the flesh. The task of the operator 7 is also that of catching the piece of meat 6 again past the roller 2 and blade 5 and therefore his/her hands act in the vicinity of roller 2 and blade 5.

All metal parts of the flaying machine 1 are electrically connected to a collector 9 which in turn is electrically connected to the safety system 100 according to the invention, as shown in FIG. 1.

The safety system 100 comprises a signal generator 10 generating a square wave of constant voltage the value of which is ±15 V at a frequency of about 300 KHz.

A resistor 11 is set in series to generator 10 and an inductor 12 is set in parallel to them both. In addition, this inductor is disposed between the operating machine 1 and the ground.

Determination means 20 fixes a main parameter representative of the electric interaction between the operator 7 and the operating machine 1. This main parameter can be representative of the signal to the ends of inductor 12, for example.

Preferably, the main parameter representative of the contact between the operator 7 and the operating machine 1 is an electric voltage, in particular the voltage at the ends of inductor 12.

Alternatively, other parameters can be a capacity or a current.

In the following, for the sake of simplicity, reference will be made to a voltage as an example of a representative parameter.

The signal at the ends of inductor 12 can be filtered by filtering means 13, of the band-pass type for example; this signal is therefore rectified with a rectifier 14.

The rectified signal is then sent to comparison means 15, a comparator for example, controlling that the value of the rectified signal is greater than a main reference value, stored in a memory circuit 16; this control is advantageously obtained by the process of the present invention that will be described in detail in the following.

Advantageously, in accordance with the invention, the comparison means 15 and memory circuit 16 are included in a processing unit 101 of the safety system 100.

The determination means 20 is shown by way of example in parallel to inductor 12, but can also be integrated into the memory circuit 16; said means enables voltage determination at the ends of inductor or determination of the electric measurements representative of the electric interaction between operator 7 and flaying machine 1.

If, during operation of the machine 1, the value of the main parameter is smaller than the main reference value provided by the invention, then the comparator 15 of the processing unit 101 operates means for activation of an alarm procedure.

Said activation means may for example comprise an actuator 17 that in turn operates running reversal of motor 3 controlling operation of roller 2, and subsequent stopping of same.

Alternatively, since the starting setting step precedes any step for determination of the main parameter and storage of same, the machine 1 may be not even allowed to carry out a first activation.

It is generally to be pointed out that in the present context and in the following claims, the safety system 100 has been shown as divided into distinct functional modules for the only purpose of clearly and fully describing the functionalities of the system itself.

Actually, this safety system can consist of one or more electronic devices suitably programmed for performing the above described functions, and the different modules may correspond to hardware components and/or software routines being part of the programmed devices.

In addition, the devices can be made by means of known analog or digital components.

Figure 2:
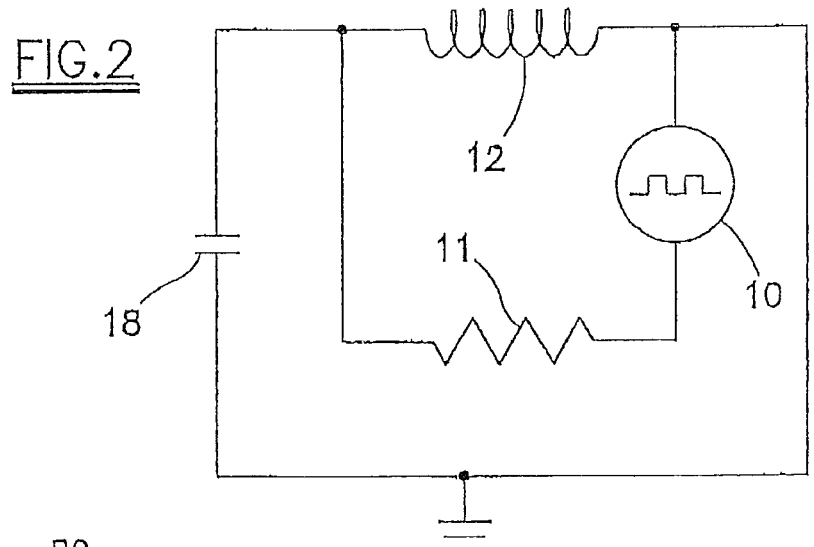
FIG. 2 shows an equivalent electric circuit of the invention applied to a flaying machine during operation of same when the operator is at a distance from the machine.

In greater detail as regards operation of the flaying machine 1, generator 10, powered by a conventional insulation transformer not shown, generates a voltage signal (±15 V) to the resonance frequency of the equivalent electric circuit, represented in FIG. 2, taking into account the stray capacity 18 present between the flaying machine 1 and the ground, since said machine is electrically insulated from the ground.

By way of example, the stray capacity can be around tens of pico-Farad.

In this case, theoretically, the signal generator 10 at the resonance frequency does not provide energy to the system, because the energy is mutually exchanged between the stray capacity 18 and inductor 12. The result is that at the ends of inductor 12 there is a voltage value equal to the voltage value of generator 10. Actually, the voltage value at the ends of inductor 12 is slightly smaller than the theoretical value (equal to the voltage value of generator 10) due to the non-ideality of the circuit components.

Figure 5:
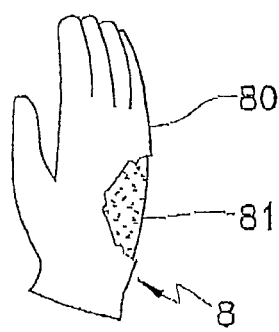
FIG. 5 shows a garment that the operator has to wear during use of the machine.

Furthermore, it is possible to view from FIG. 1 that the operator 7 is wearing a pair of gloves 8 that, as shown in FIG. 5, comprise at least one outer part 80, of electrically insulating material, and at least one inner part 81 made of an electrically conductive material, directly in contact with the operator's hands.

Preferably, the operating conditions of the flaying machine 1 are determined by the electric interaction between operator 7 and flaying machine 1.

In the present discussion it has been considered as the ordinary operation of the flaying machine 1 the operation in which operator 7 does not come into direct electric contact with the machine 1; in other words, the operator 7 pushes the piece of meat 6 on roller 2 towards blade 5 without any contact existing between gloves 8 and flaying machine 1.

For avoiding undesirable interventions of the safety system, the alarm-detecting process of the invention advantageously contemplates a starting step of setting the main reference value for the aforesaid main parameter.

Preferably, the starting setting step precedes any step of determining the main parameter and storing it.

Preferably, the starting setting step is carried out by the processing unit 101, for each operator starting working on the operating machine in such a manner that the described particular operating conditions can be accurately defined and efficiently detected so as to ensure the maximum safety degree.

The starting setting step comprises the step of:
detecting a first reference value under a condition of electric insulation between operator 7 and operating machine 1.

This electric-insulation condition is obtained through a contact between at least one insulating part 80 of gloves 8 and the operating machine 1.

In particular, when the operator 7 during the starting setting step touches a metal portion of the machine with at least one insulating layer 80 of the gloves, he/she introduces a trouble element into the circuit in FIG. 2.

Under this circumstance, a maximum voltage Vmax is read at the ends of inductor 12, which voltage corresponds to the first reference value for the main parameter.

The starting step of setting a range of reference values further comprises the step of:
detecting a second reference value in a condition of electric conduction between operator 7 and operating machine 1.

This electric-conduction condition is obtained through contact between at least a conductive part 81 of gloves 8 and the flaying machine 1.

In particular, this happens in the setting step when the operator raises or slightly moves the insulating layer 80 and allows a contact between a metal portion of the flaying machine's frame and the conductive layer 81.

Under this circumstance, a minimum voltage Vmin is read at the ends of inductor 12 which corresponds to the second reference value for the main parameter. In this manner said second reference value for the main parameter detected by the determination means 20 is determined.

Through the processing unit 101 it is therefore possible to calculate the main reference value as a function of the first and second reference values. The main reference value is determined in such a manner that it appears to be included between the first and second reference values.

By way of example, the main reference value can be calculated as an arithmetic mean between the first and second reference values.

Note that also other calculation methods for obtaining the main reference value can be employed.

The main reference value represents the intervention threshold of the aforesaid activation means of the alarm procedure.

If the intervention threshold were defined of the same value as the second reference value (representative of the short-circuit condition between operator and machine), the safety system could not operate in a reliable manner, since the presence of the piece of meat interposed between the operator and the machine structure (note that this piece of meat is absent during the starting setting step, being on the contrary present during normal operation of the machine) would disturb the system too much and would not enable correct detection of the alarm condition approaching.

Therefore, the intervention threshold must be fixed to a higher value; to this aim also the first reference value is determined and the main reference value is fixed within the range defined by the first and second reference values.

During normal operation of the machine 1, the operator pushes a piece of meat on roller 2 and blade 5, while maintaining himself/herself in a condition of electric insulation from the machine due to the insulating layer 80 of the gloves he/she wears.

Figure 3:
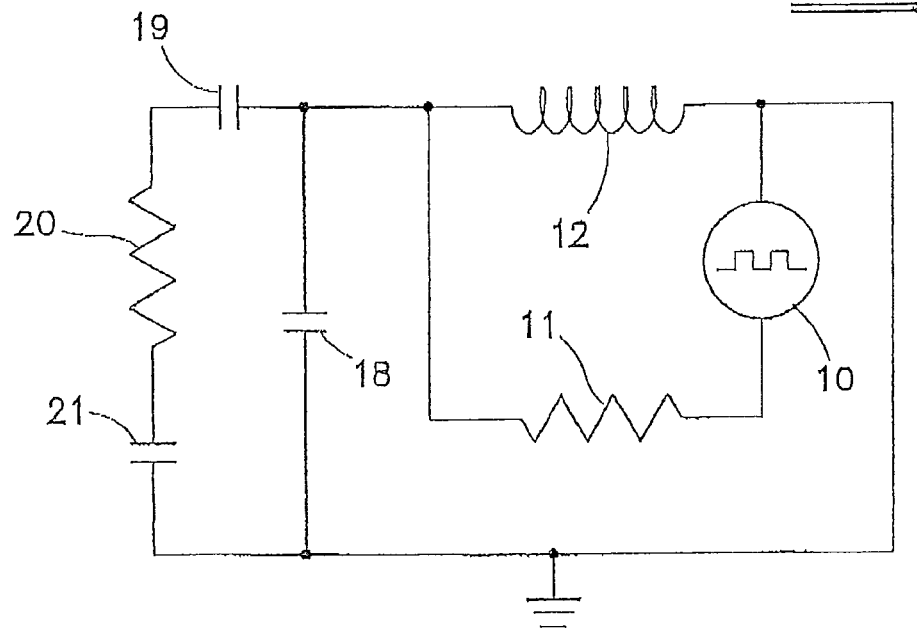
FIG. 3 shows an equivalent electric circuit of the invention applied to a flaying machine during normal operation of same when the operator is in a work position.

Should the operator accidentally come into contact with the metallic structure of the machine 1 by the insulating layer 80, the situation shown in FIG. 3 occurs, where it is possible to see that a branch has been added to the circuit in FIG. 2, which branch comprises:
- the stray capacity 19 that is formed between the man's glove 8 and the metallic portion of the machine 1 the operator comes into contact with,
- the resistance 20 of the man's body, and
- the stray capacity 21 between the shoes the man wears and the ground.

In this case the circuit in FIG. 3 operates no longer to the resonance frequency, but to a frequency close to the resonance one, and the voltage value measured at the ends of inductor 12 is slightly smaller than the voltage value present at the inductor ends in the condition shown in FIG. 2; in fact, the operator absorbs a small current value when he/she comes into contact with a metallic portion of the machine through the stray capacity 19.

Figure 4:
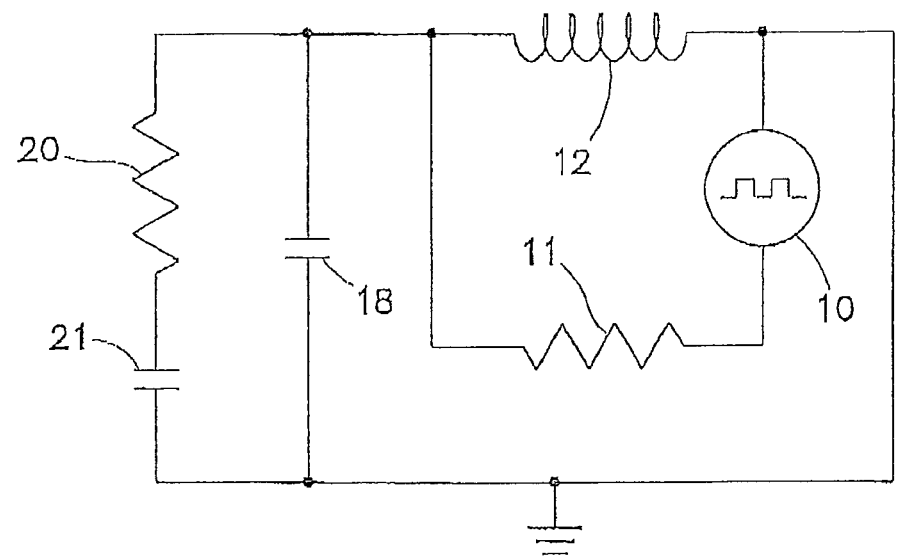
FIG. 4 shows the equivalent electric circuit of the invention applied to a flaying machine when the operator accidentally comes into contact with the machine's tool (blade)

In case the operator should be in a condition of electric contact with the metallic structure of the machine 1 through the conductive layer 81, the equivalent circuit shown in FIG. 4 is obtained, in which the stray capacity 19 is not present. The man's influence is much greater than in the preceding case, and therefore the voltage drop at the ends of inductor 12 varies in a considerable manner.

Should the voltage at the ends of inductor 12, i.e. the main parameter, be lower than the main reference value (calculated as above described), intervention of the activation means of the alarm procedure is triggered by the system, which activation means in particular comprises an actuator 17 operating rotation reversal of motor 3 and subsequent stopping of same.

In this manner the machine 1 can be stopped and accidents to the operator can be prevented and avoided.

Alternatively, since the starting setting step precedes any step of determining the main parameter and storing it, should voltage at the ends of inductor 12, i.e. the main parameter, be lower than the main reference value, the machine cannot even be allowed to implement a first activation.

Figure 6:
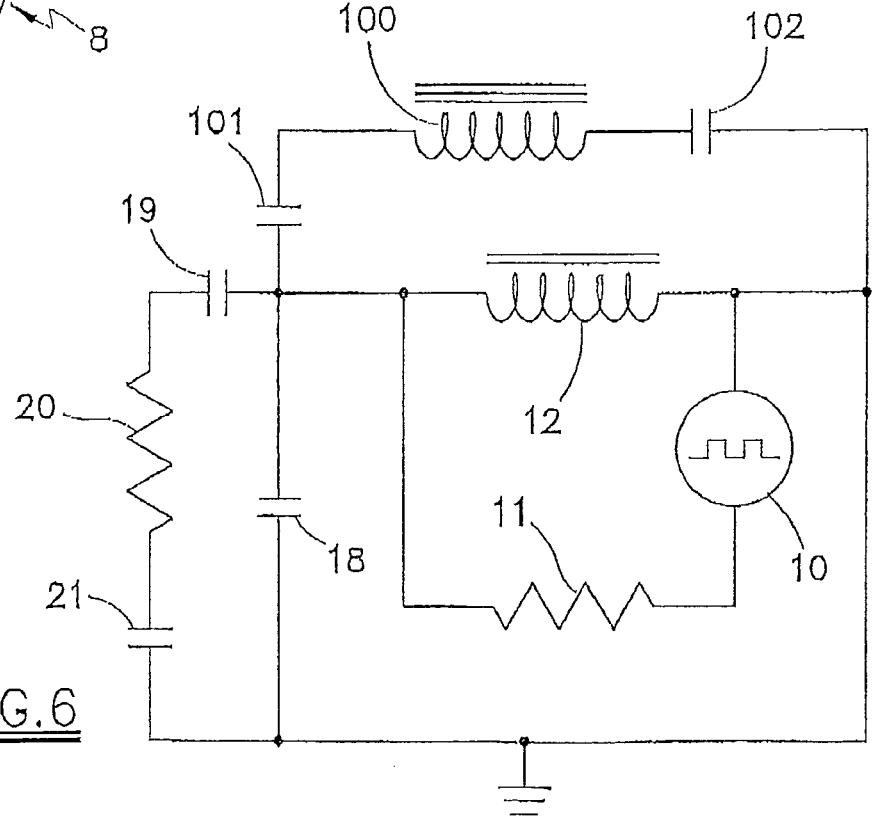
FIG. 6 shows the equivalent electric circuit of the invention applied to a flaying machine, with the operator in the work position, according to a particular different configuration.

It is finally to be pointed out that in case the machine should be powered by a cable comprising the phase conductors and the protective earth (PE), it is necessary to connect a single-phase or multiphase inductor (FIG. 6) in series with the phase conductors to prevent a trouble element capable of jeopardizing regular operation of the safety system from being introduced into the circuit of FIG. 2. In fact, it may happen that the resonance signal closes on the protective earth (PE) through the stray capacity 101 that is formed between the phase conductors and protective earth (PE), and through the stray capacity 102 present between the work motor windings and the frame of the motor and the machine.

The invention claimed is:

1. A process for detecting an alarm in a operating machine, so that an operator is able to interact with such a machine determining a connection between the machine and the ground, comprising the steps of:
- determining a current value of a main parameter representative of an electric interaction between said operator and the operating machine under a condition of ordinary operation of said machine;
- comparing said determined current value with a main reference value;
- activating an alarm procedure as a function of said comparison;
- wherein it comprises a starting setting up step wherein said main reference value is determined, said starting setting up step comprising the steps of:
- detecting a first reference value of said main parameter under a condition of electric insulation between said operator and the operating machine;
- detecting a second reference value of said main parameter under a condition of electric conduction between said operator and the operating machine;
- said main reference value being determined in such a manner that it is an intermediate value between said first reference value and second reference value.

2. A process as claimed in claim 1, comprising the step of storing said main reference value on a memory.

3. A process as claimed in claim 1, wherein the main parameter is a voltage measured between said operating machine and the ground passing through said operator.

4. A process as claimed in claim 3, wherein said voltage is measured at the ends of an inductor disposed between said operating machine and the ground.

5. A process as claimed in claim 4, wherein said inductor is placed in parallel to the series configuration of a signal generator and a resistor.

6. A process as claimed in claim 1, wherein said first reference value is a voltage value measured between said operating machine and the ground passing through said operator.

7. A process as claimed in claim 1, wherein said second reference value is a voltage value measured between said operating machine and the ground passing through said operator.

8. A process as claimed in claim 1, wherein said conditions of ordinary operation, electric conduction and electric insulation of the operating machine, are determined by the electric interaction between the gloves worn by said operator and said operating machine.

9. A process as claimed in claim 8, wherein said gloves have at least one insulating outer portion and at least one conductive inner portion.

10. A process as claimed in claim 9 wherein the condition of electric insulation is obtained by contact between said at least one insulating portion of said glove and said operating machine.

11. A process as claimed in claim 9, wherein said condition of electric conduction is obtained by contact between said at least one conductive portion of said glove and said operating machine.

12. A safety system for an operating machine so that an operator is able to interact with such a machine determining a connection between the machine and the ground, comprising:
  a processing unit;
  determination means adapted to determine a current value of a main parameter representative of the electric interaction between said operator and said operating machine under a first condition of ordinary operation of said machine;
  comparison means included in said processing unit and adapted to compare said determined current value with a main reference value;
  activation means for starting an alarm procedure, adapted to be activated as a function of said comparison;
  wherein said processing unit has a configuration suitable for:
  activating said determination means for detecting a first reference value of said main parameter under a condition of electric insulation between said operator and the operating machine;
  activating said determination means for detecting a second reference value of said main parameter under a condition of electric conduction between said operator and the operating machine;
  determining said main reference value in such a manner that said value will be an intermediate value between said first reference value and second reference value.

13. A safety system as claimed in claim 12, wherein said processing unit comprises storage means for storing said main reference value.

14. A safety system as claimed in claim 12, comprising locking means for said operating machine associated with means for activating the alarm procedure.

15. An operating machine, comprising a safety system so that an operator is able to interact with such a machine determining a connection between the machine and the ground, comprising:
  a processing unit;
  determination means adapted to determine a current value of a main parameter representative of the electric interaction between said operator and said operating machine under a first condition of ordinary operation of said machine;
  comparison means included in said processing unit and adapted to compare said determined current value with a main reference value;
  activation means for starting an alarm procedure, adapted to be activated as a function of said comparison;
  wherein said processing unit has a configuration suitable for:
  activating said determination means for detecting a first reference value of said main parameter under a condition of electric insulation between said operator and the operating machine;
  activating said determination means for detecting a second reference value of said main parameter under a condition of electric conduction between said operator and the operating machine;
  determining said main reference value in such a manner that said value will be an intermediate value between said first reference value and second reference value.

16. An operating machine as claimed in claim 15 wherein said processing unit comprises storage means for storing said main reference value.

17. An operating machine as claimed in claim 15 comprising locking means associated with means for activating the alarm procedure.

\* \* \* \* \*